United States Patent [19]

Barton

[11] Patent Number: 5,064,604

[45] Date of Patent: Nov. 12, 1991

[54] COST EFFECTIVE FLUID LINE STATUS SENSOR SYSTEM

[75] Inventor: Serge P. Barton, Oviedo, Fla.

[73] Assignee: Westinghouse Electric Corp., Pittsburgh, Pa.

[21] Appl. No.: 476,197

[22] Filed: Feb. 7, 1990

[51] Int. Cl.$^5$ ............................................. G21C 17/00
[52] U.S. Cl. .................................... 376/246; 376/245; 376/247
[58] Field of Search .................... 376/246, 247, 245; 374/10, 12, 13, 147; 116/273; 236/69

[56] References Cited

U.S. PATENT DOCUMENTS

| | | | |
|---|---|---|---|
| 3,874,239 | 4/1975 | Finney | 374/147 |
| 4,031,740 | 6/1977 | Achermann | 374/13 |
| 4,484,471 | 11/1984 | Swithenbank et al. | 73/204.15 |
| 4,859,076 | 8/1989 | Twerdochlib | 374/10 |

Primary Examiner—Brooks H. Hunt
Assistant Examiner—Meena Chelliah

[57] ABSTRACT

A sensor assembly comprising a rod-shaped thermally conductive element oriented radially with respect to a flow pipe and two or more thermocouples installed on the thermally conductive element. A first end of the thermally conductive element is arranged in contact with or in thermal communication with the outer periphery of the pipe, while a second end of the thermally conductive element is spaced from the pipe. As a result of heat conduction through the pipe to the first end, a temperature gradient is provided across the thermally conductive element. The temperature gradient exhibits a relatively high temperature near the first end and a relatively low temperature near the second end. The thermocouples are installed along the length of the thermally conductive element. One thermocouple is arranged nearer to the pipe than the other thermocouple. Temperature dependent signals obtained from the thermocouples are transmitted to suitable evaluation electronics. The evaluational electronics determines a temperature difference between the two thermocouples based on the thermocouple signals. The temperature difference is then compared with known or preset values to determine the flow status of the pipe.

19 Claims, 2 Drawing Sheets

COST EFFECTIVE FLUID LINE STATUS SENSOR SYSTEM

BACKGROUND OF THE INVENTION

The present invention relates to a fluid line status sensor system which can be used to determine whether fluid is flowing, contained, or absent in a pipe or vessel.

In a typical power plant, there are hundreds of fluid pipelines for conveying fluid (e.g., hot steam) through heat exchangers and to and from a turbine. Fluid which passes through these lines is, in many cases, at a temperature well above the ambient temperature of the environment in which the pipes are located.

Fluid pipe systems, such as those used in a typical power plant, may include flow status monitoring systems. Power plant monitoring and on-line diagnostic systems often require electronic verification of the flow status in various pipelines, such as drain lines or process fluid lines. As these lines can be valved in and out of the overall flow circuit, the flow in these lines may be intermittent.

It is beneficial to verify by independent signals whether contact closures associated with flow control devices, such as isolation valves or dump valves, have produced the state of flow expected. Generally, it is of interest to verify whether a large flow exists (e.g., a relatively large volume of fluid is flowing through the pipe), no flow exists, or a significant leakage flow exists (e.g., a relatively small volume of fluid is flowing from a leaky valve).

Diagnostic systems may employ sensors located at hundreds of locations about the fluid pipe systems. Such diagnostic systems can be extremely expensive. The total installed cost of sensors in such systems can be a significant portion of the overall system cost. Accordingly, it is beneficial to employ an inexpensive sensor at each of the sensing locations. Such inexpensive sensors may include thermocouples.

Some conventional systems employ several one-of-a-kind installations of thermocouple junction devices (hereafter referred to as thermocouples). Each installation having an arrangement of thermocouples mounted axially (with respect to the pipe) on a pipe surface across a valve or over a span where a significant thermal difference is developed during operation. However, this axial arrangement of thermocouples gives rise to several disadvantages. For example, several long lengths of wires are required to connect the axially arranged thermocouples with evaluation electronics. Additionally, engineering costs in determining locations for placing the thermocouples are relatively high in such conventional systems. Moreover, engineering costs for interpreting signals provided by several one-of-a-kind installations are relatively high. Furthermore, with the axially arranged thermocouples located to produce differential signals from two axial locations (e.g., on either side of an isolation valve), flow blockage occurring elsewhere (e.g., at the mouth of a drain line) in the fluid line cannot be detected.

SUMMARY OF THE INVENTION

It is, therefore, an object of the present invention to provide an improved fluid line status sensor system for determining the flow status of a pipe or vessel.

It is further an object of the present invention to provide such a fluid line status sensor system which includes a relatively inexpensive sensor device.

It is further an object of the present invention to provide such a fluid line status sensor system which is relatively easy and inexpensive to install in conjunction with a fluid pipe system.

These and other objects are accomplished according to an embodiment of the present invention by employing a relatively inexpensive sensor assembly comprising a rod-shaped thermally conductive element oriented radially with respect to a flow pipe and two or more thermocouples installed on the thermally conductive element. A first end of the thermally conductive element is arranged in contact with or in thermal communication with the outer periphery of the pipe, while a second end of the thermally conductive element is spaced from the pipe. As a result of heat conduction between the pipe and the first end, a temperature gradient is created along the thermally conductive element since the temperature at the end of the element adjacent the pipe is influenced by the temperature within the pipe to a greater extent than is the temperature at the end of the element remote from the pipe. For example, a relatively high temperature may exist near the first end and a relatively low temperature near the second end. The thermocouples are installed along the length of the thermally conductive element. One thermocouple is arranged nearer to the pipe than the other thermocouple.

Temperature dependent signals obtained from the thermocouples are transmitted to suitable evaluation electronics. The evaluation electronics determine a temperature difference between the two thermocouples based on the thermocouple signals. The temperature difference is then compared with known or predetermined values to determine the flow status of the pipe.

BRIEF DESCRIPTION OF THE DRAWINGS

The detailed description of the invention will be made with reference to the accompanying drawings wherein like numerals designate corresponding parts in the several figures.

DESCRIPTION OF THE PREFERRED EMBODIMENTS

The following detailed description is of the best presently contemplated mode of carrying out the invention. This description is not to be taken in a limiting sense, but is made merely for the purpose of illustrating the general principles of the invention. The scope of the invention is best defined by the appended claims.

In the following description, embodiments of the present invention are discussed in conjunction with a fluid pipe system for conveying fluid having a temperature above the ambient temperature of the environment in which the fluid pipe system is located. The described embodiments are particularly suitable for use in conjunction with a power plant pipe system, e.g., a pipe containing steam or water in a fossil fuel or nuclear power plant. However, it will be recognized that embodiments of the present invention may be applied to fluid pipe or vessel systems other than those employed in a power plant.

Figure 1:
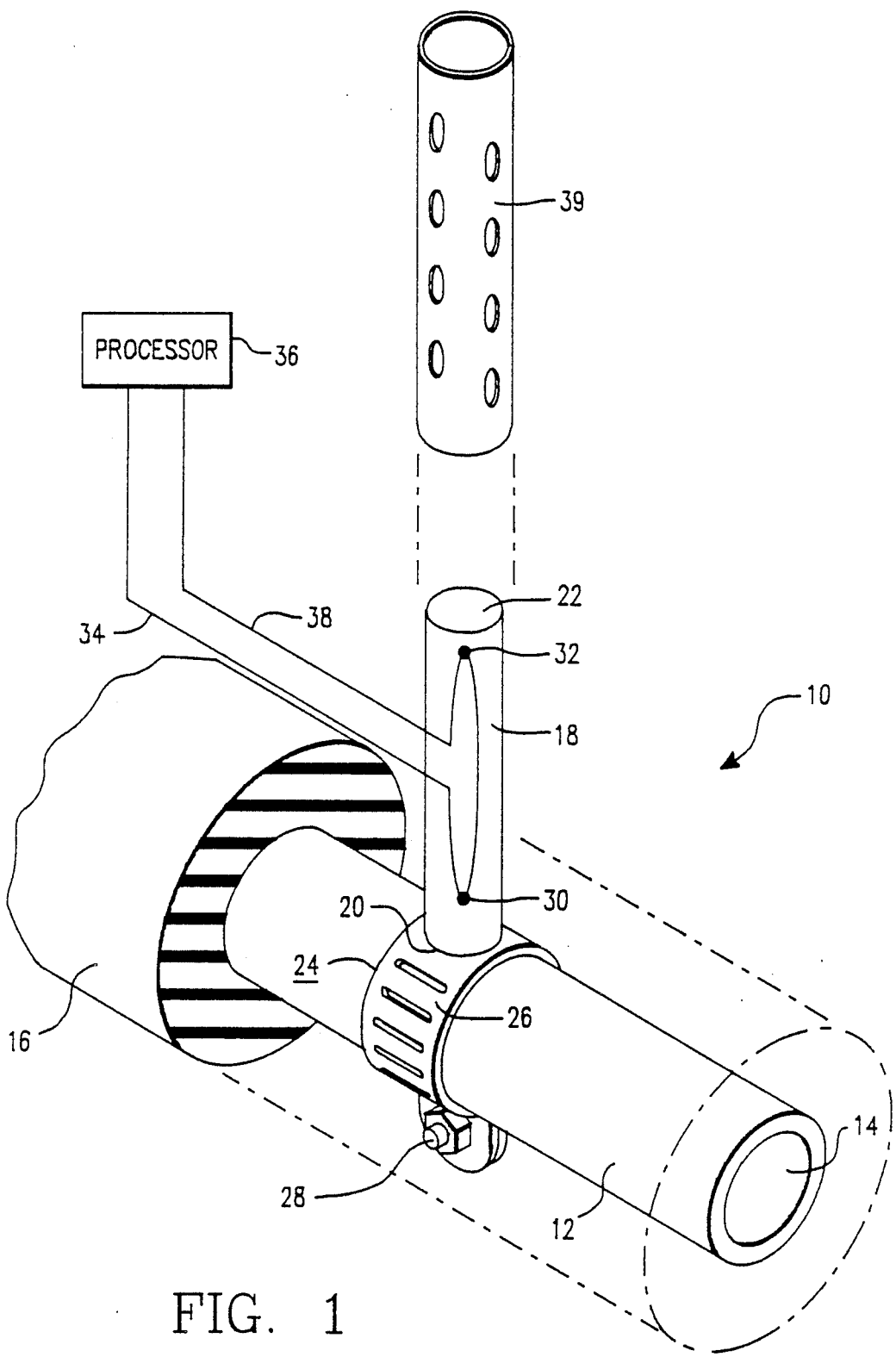
FIG. 1 is a perspective view of a portion of a fluid pipe and a flow status sensor according to an embodiment of the present invention.

FIG. 1 shows a sensor assembly 10 connected with a portion of a fluid pipe 12. Pipe 12 comprises a cylindrically shaped heat conducting material, preferably a metal such as lead, iron, copper, or stainless steel, or any other suitable heat conducting material, defining a hollow interior 14 through which a fluid may be conveyed. A layer of insulating material 16 may be provided about the circumference of pipe 12.

Pipe 12 can be a portion of a fluid pipe system employed in, for example, a power plant. Fluid conveyed by pipe 12 may be fluid moving through or between various power plant systems, including fluid conveyed to or from a turbine rotor.

Sensor assembly 10 includes a heat conducting element 18 arranged in thermal communication with pipe 12. In the FIG. 1 embodiment, heat conducting element 18 is provided in the form of a cylindrical rod having a first end 20 and a second end 22. Heat conducting element 18 is composed of a heat conducting material, such as a metal As shown in FIG. 1, heat conducting element 18 extends radially from pipe 12 and extends through insulating material 16. Rod end 20 is arranged nearer to pipe 12 than rod end 22. Preferably, rod end 20 is arranged to abut the outer periphery of pipe 12.

Heat conducting element 18 is attached to pipe 12 by a clamp 24. As described below, the use of clamp 24 allows heat conducting element 18 to be attached to pipe 12 without requiring drilling or welding. It will be recognized, however, that other means and methods of attaching heat conducting element to pipe 12 (including those which require drilling or welding) would not diverge from the present invention.

Clamp 24 can be similar to an automobile hose clamp. In this regard, clamp 24 can include a band 26 arranged about the periphery of pipe 12. A threaded fastener 28 connected with band 12 operates to selectively increase or reduce the diameter of band 26. Additionally, threaded fastener 28 can be unthreaded to a point where band 26 can be opened and fitted over pipe 12. Once band is fitted over pipe 12, threaded fastener 28 may be closed or tightened to decrease the diameter of band 26. As a result, band 26 can be clamped and attached with pipe 12.

Heat conducting element 18 is secured with band 26 by any suitable securing means, such as brazing or welding. In one embodiment, end 20 of heat conducting element 18 extends through an aperture in band 26 and abuts the outer periphery of pipe 12. In another embodiment, end 20 of heat conducting element 18 may be secured with the outer periphery of band 26. In this other embodiment, band 26 must be formed of heat conducting material, such as metal, so as to transmit heat from pipe 12 to end 20.

As discussed above, heat conducting element 18 may be provided in the form of a rod extending radially with respect to pipe 12. First and second thermocouple junctions 30 and 32, respectively, (hereafter referred to as thermocouples) are provided on heat conducting element 18. First thermocouple 30 is arranged closer to end 20 of heat conducting element 18 than is second thermocouple 32. On the other hand, second thermocouple 32 is arranged closer to end 22 of heat conducting element 18 than is first thermocouple 30. As will be discussed below, a purpose of this arrangement is to dispose first thermocouple 30 at a location which will experience a greater temperature than the location at which second thermocouple 32 is provided. In this regard, it will be recognized that other arrangements of thermocouples to provide this desired effect are possible.

Each thermocouple 30 and 32 has first and second electrical leads. A first conductor 34 extends between the first lead of first thermocouple 30 and a signal processing unit 36. A second conductor 38 extends between the first lead of second thermocouple 32 and processing unit 36. The second lead of first thermocouple 30 is connected with the second lead of second thermocouple 32, to, thereby, differentially connect first and second thermocouples 30 and 32. It will be recognized, however, that other suitable connecting arrangements for connecting thermocouples 30 and 32 to processing unit 36 may be employed.

Conductors 34 and 38 shown in FIG. 1 are conventional wire conductors. With thermocouples 30 and 32 differentially coupled, as shown in FIG. 1, wire conductors 34 and 38 can comprise an inexpensive two-conductor copper cable. However, it will be recognized that other conducting means or signal transmission means (e.g., wireless transmission means) for conveying a signal from thermocouples 30 and 32 to processing unit 36 may be employed.

Thermocouples 30 and 32 and heat conducting element 18 may be provided with a shield 39, such as a perforated hollow cylindrical sleeve extending from band 26 and arranged about heat conducting element 18. Shield 39 is shown in FIG. 1, in an exploded format, so as to clearly reveal the structure of heat conducting element 18 and thermocouples 30 and 32. Other suitable shield structures may be used as an alternative to a perforated hollow cylindrical structure. Preferably, shield 39 allows the ambient temperature to be communicated to the heat conducting element 18, but minimizes the affect of ambient air currents on the temperature distribution across heat conducting element 18. Shield 39 can also provide protection for thermocouples 30 and 32 and heat conducting element 18 against damage resulting from physical contact with other bodies. Shield 39 can also provide a dirt and dust barrier to inhibit the collection of dirt and dust on or around thermocouples 30 and 32 and heat conducting member 18.

Processing unit 36 includes electronics designed to evaluate the temperature differential signals transmitted from thermocouples 30 and 32 along conductors 34 and 38, respectively, in a well known manner. Further features of processing unit 36 will be discussed below.

During operation, fluid may intermittently flow through the hollow interior section 14 of pipe 12. Such fluid has a temperature which is greater than the ambient temperature of the environment in the vicinity of pipe 12 and sensor assembly 10.

When fluid flows through pipe 12, heat from the fluid is transmitted through the walls of pipe 12 to end 20 of heat conducting element 18. Heat conveyed to end 20 is conducted along heat conducting element 18 toward end 22. However, since end 20 is arranged closer to the heat source (the fluid and pipe 12) than is end 22, heat conducted through heat conducting element 18 will create a temperature gradient across the length of heat conducting element 18 (in a radial direction with respect to pipe 12). That is, a relatively high temperature will occur near end 20 and a relatively low temperature will occur near end 22 of heat conducting element 18. The temperature along heat conducting element 18 between ends 20 and 22 will decrease in the direction from end 20 to end 22.

With the above-described arrangement of first and second thermocouples 30 and 32, respectively, first thermocouple 30 is arranged at a higher temperature region of the temperature gradient than is second thermocouple 32. As a result, first thermocouple 30 will be heated to a greater extent by the heat source (the fluid and pipe 12) than will second thermocouple 32.

Therefore, when the fluid passes through pipe 12, a temperature differential will be produced between first and second thermocouples 30 and 32, respectively. When a large volume of hot (with respect to the ambient temperature) fluid flows through pipe 12 (e.g., when a valve upstream of pipe 12 is wide open), a relatively large amount of thermal conduction occurs through the walls of pipe 12 and a relatively large steady state temperature differential will occur between first and second thermocouples 30 and 32 within a relatively short period of time. However, when a small volume of fluid flows through pipe 12 (e.g., when a valve upstream of pipe 12 is closed but leaking), a relatively small amount of thermal conduction occurs through the walls of pipe 12 and a significantly smaller steady state temperature differential will occur between first and second thermocouples 30 and 32 within a relatively long period of time. When no fluid flows through pipe 12 (e.g., when an upstream valve is closed and not leaking or when a pipe blockage occurs upstream), a very small steady state temperature differential occurs between first and second thermocouples 30 and 32.

Signals transmitted on conductors 34 and 38 represent the temperature differential between thermocouples 30 and 32. Signal analyzing electronics (not shown) provided in processing unit 36 can determine the temperature differential between first and second thermocouples 30 and 32, respectively, and the flow status of pipe 12 by analyzing signals transmitted on conductors 34 and 38, using logic, as described below, in a well known manner.

Figure 2:
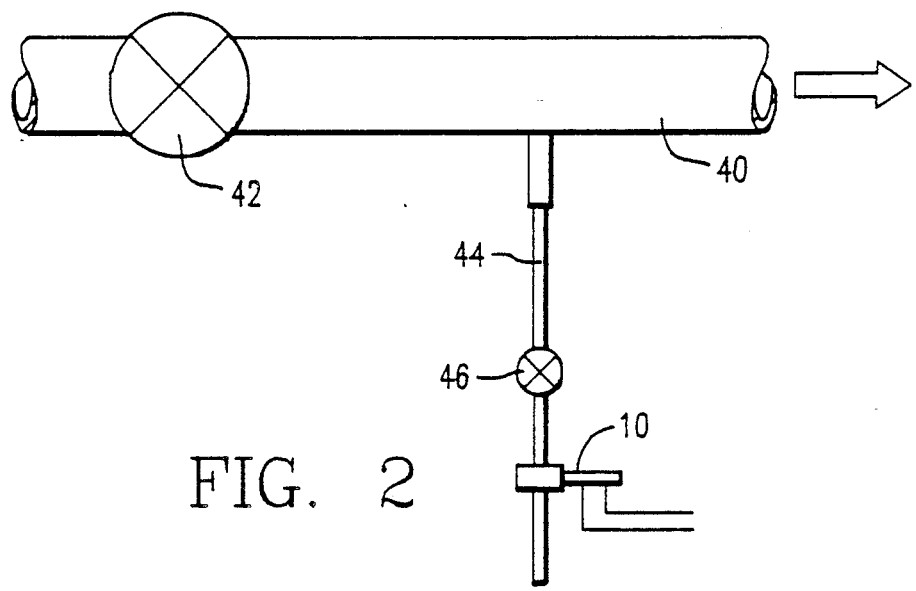
FIG. 2 is a schematic view of a portion of a fluid pipe system employing an embodiment of the present invention.
Figure 3:
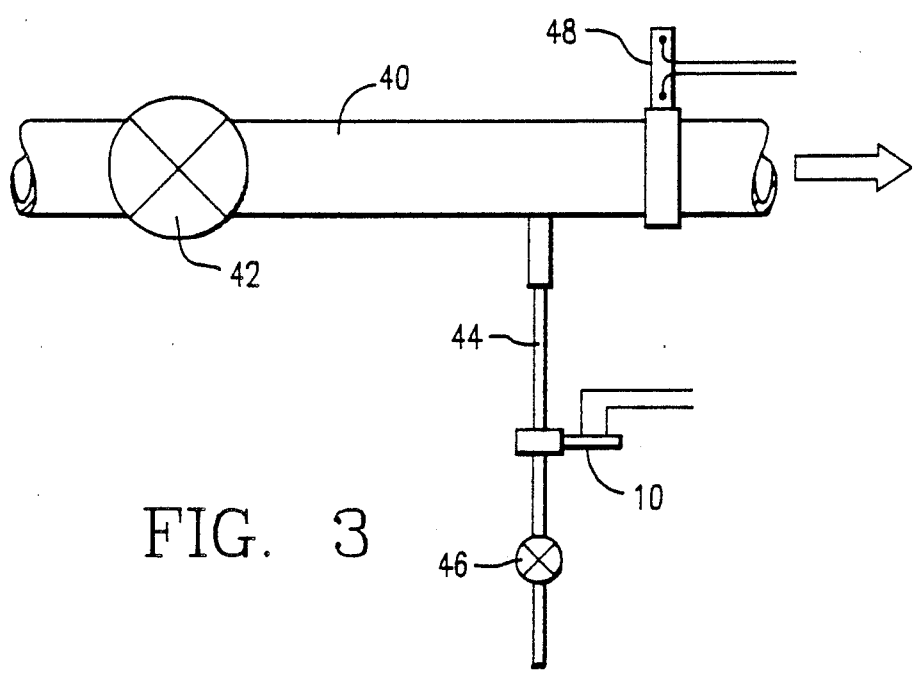
FIG. 3 is a schematic view of a portion of a fluid pipe system employing an embodiment of the present invention.

FIGS. 2 and 3 illustrate a portion of a pipe system in which embodiments of the present invention are employed. Each of these Figures show a fluid pipe 40 provided with a valve 42 and a drain line 44. A drain valve 46 is provided in drain line 44.

Referring to FIG. 2, a sensor assembly 10, similar to that described with reference to FIG. 1, is arranged on drain line 44. Drain valve 46 is located between sensor assembly 10 and pipe 40.

In the FIG. 3 embodiment, a first sensor assembly 10, similar to that described with reference to FIG. 1, is arranged on drain line 44 between drain valve 46 and pipe 40. A second sensor assembly 48, also similar to that described with reference to FIG. 1, is arranged on pipe 40. Drain line 44 in FIG. 3 extends from pipe 40 at a location between valve 42 and sensor assembly 48.

Processing unit 36 may include well known logic devices (not shown) or a well known programmable processing device (not shown) for analyzing signals transmitted along conductors 34 and 38, or for evaluating the temperature differential determined by the signal analyzing electronics. Such devices can be designed or programmed to determine the flow condition occurring in pipe 12 (FIG. 1) or in pipes 40 and 44 (FIGS. 2 and 3). For example, where $\delta T$ represents the steady-state difference between the values of the signal transmitted by conductors 34 and 38, and where $T_A$, $T_B$, $T_C$, $T_D$ and $T_E$ are preset or predetermined signal difference values, processing unit 36 can be designed or programmed, in a well known manner, to make the following determinations:

1. A high flow condition occurs when steady state $\delta T > T_A$ (this condition may be associated with a wide-open valve condition, e.g., the condition when drain valve 46 in FIG. 2 is wide-open);

2. A low flow (or leaky valve) condition can be indicated by $T_B < \delta T < T_C$;

3. A no flow condition (or blocked pipe) can be indicated by $T_D < \delta T < T_E$ (this condition may be associated with a closed valve condition, e.g., the condition when drain valve 46 in the FIG. 3 embodiment is closed);

wherein the comparison values ($T_A - T_E$) are selected on the basis of anticipated flow conditions so that processing unit 36 is operative to monitor only compliance with the anticipated flow condition.

Processing unit 36 may also employ system status information when analyzing signals transmitted from thermocouples 30 and 32. For example, such system status information as the expected valve status may be employed, in conjunction with information transmitted from thermocouples 30 and 32, to determine if a valve is operating as expected or to determine if the flow status in a particular pipeline is as expected. The expected valve status information may be provided to processing unit 36 from, e.g., an input device (not shown) in which a technician has manually entered such information. Alternatively, the expected valve status information may be provided by a valve control device (not shown), a valve movement sensor (not shown), valve control software (not shown), or the like. As input devices, valve control devices, valve movement sensors and valve control software are well known in the art, further details of these features are not provided in order to simplify the present disclosure.

In turbine systems, such as power generating systems, processing unit 36 may also employ turbine load information or process fluid temperature information when analyzing signals transmitted from thermocouples 30 and 32. For example, the predetermined values $T_A - T_E$ may be dependent upon the instantaneous turbine load or process fluid temperature. Turbine load information and process fluid temperature information may be obtained from suitable sensing devices (not shown) which are well known in the art.

Processing unit 36 may also include well known means for evaluating the rate of change of $\delta T$ to obtain information about the magnitude of the external heat transfer coefficient at the sensor location. Since this external heat transfer coefficient magnitude is dependent upon the rate of fluid flow inside of the pipe at the sensor location, processing unit 36 may determine the rate of flow from signals transmitted from thermocouples 30 and 32.

The above-described status determinations are provided merely as examples of the determinations and the manner in which the determinations are made by processing unit 36. Other methods of analyzing temperature dependent signals transmitted from thermocouples 30 and 32 may be employed.

While the description above refers to particular embodiments of the present invention, it will be understood that many modifications may be made without departing from the spirit thereof. For example, more than two thermocouples may be provided on the heat conducting element 18, e.g., for providing signals representing more details of the temperature gradient formed along the element 18 or for providing redundant signals for safety and accuracy purpose. The accompanying claims are intended to cover modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A flow status sensor for sensing the flow condition of a fluid conveying pipe, said sensor comprising:
   a heat conducting member having one end arranged in thermal communication with the outer periphery of the pipe, the heat conducting member having first and second locations spaced part in a direction transverse to the flow of fluid through the pipe to that the relation between the temperatures at said first and second locations is representative of the rate of flow of fluid through the pipe,
   first and second thermocouples having first and second leads connected together to form a junction, with said junctions of said thermocouples each being disposed in thermal communication with a respective one of said first and second locations to provide signals having values dependent on the temperatures of said heat conducting member at said first and second locations, respectively, and
   evaluation means operatively connected to said first and second junctions for evaluating signals provided by said first and second junctions to provide an indication of the relation between the temperatures at said first and second locations of said heat conducting member.

2. A flow status sensor as claimed in claim 1 wherein said first location is closer to said one end than is said second location.

3. In a pipe system provided with a pipe for conveying fluid having a temperature greater than the ambient temperature in the vicinity of the pipe, the improvement comprising a flow status sensor comprising:
   a heat conducting member having first and second locations thereon, said heat conducting member having one end mounted in thermal communication with the outer periphery of the pipe and defining a temperature gradient from said first location to said second location representative of the rate of flow of fluid being conveyed by the pipe;
   first and second thermocouples each having first and second leads connected together to form a junction, with said junctions of said thermocouples each being disposed in thermal communication with a respective one of said first and second locations to provide signals having values dependent on the temperatures of said heat conducting member at said first and second locations, respectively, and
   evaluation means operatively connected to said first and second junctions for evaluating signals provided by said first and second junctions to provide an indication of the relation between the temperatures at said first and second locations of said heat conducting member.

4. A flow status sensor as claimed in claim 3 wherein said heat conducting member comprises a substantially cylindrical rod composed of a heat conducting material.

5. A flow status sensor as claimed in claim 4 wherein said one end of said rod is arranged in contact with the pipe and said rod has a second end spaced from the pipe, wherein heat is communicated through the pipe toward said one end of said rod upon fluid being conveyed by the pipe.

6. A flow status sensor as claimed in claim 5 wherein said first location is closer to said one end than is said second location.

7. A flow status sensor as claimed in claim 4 wherein said rod is arranged to extend substantially radially with respect to the pipe.

8. A flow status sensor as claimed in claim 3 wherein said first and second thermocouple junctions are disposed at said first and second locations of said heat conducting member.

9. A flow status sensor as claimed in claim 3 wherein said status sensor further comprises a clamp secured to the pipe and said heat conducting member, whereby said heat conducting member is secured to the pipe.

10. A flow status sensor as claimed in claim 9 wherein said clamp comprises a band disposed about the periphery of the pipe and defining a diameter, and means for contracting the diameter of said band.

11. A flow status sensor as claimed in claim 3 wherein said leads comprise no more than one conductive wire connecting said first thermocouple junction with said evaluation means and no more than one conductive wire connecting said second thermocouple junction with said evaluation means.

12. A flow status sensor as claimed in claim 3, wherein said first lead of said first thermocouple junction is electrically connected with said first lead of said second thermocouple junction.

13. A flow status sensor as claimed in claim 12, wherein said evaluation means are electrically connected with said second leads of said first and second thermocouple junctions.

14. A flow status sensor as claimed in claim 13, wherein said first and second thermocouple junctions provide temperature dependent signals on said second leads and wherein said evaluation means are operative for evaluating signals provided on said second leads to determine the temperature differential between said first and second locations.

15. A flow status sensor as claimed in claim 14, wherein said evaluation means further comprise means for evaluating the rate of change of the temperature differential between said first and second locations.

16. A flow status sensor as claimed in claim 13, further comprising input means, operatively connected with said evaluation means, for inputting expected status data into said.

17. A flow status sensor as claimed in claim 3, further comprising a shield arranged adjacent said heat conducting member to prevent said heat conducting member and said thermocouple from being contacted by at least one of ambient air currents, dirt, dust, and bodies massive enough to damage said thermocouple junctions and said heat conducting member by contacting therewith.

18. A flow status sensor as claimed in claim 17 wherein said shield comprises a hollow member disposed about said heat conducting member.

19. A flow status sensor as claimed in claim 18, wherein said hollow member comprises a perforated substantially cylindrical member.

* * * * *